United States Patent
Jeong et al.

(10) Patent No.: US 12,066,677 B2
(45) Date of Patent: Aug. 20, 2024

(54) BALANCED ACTIVE STABILIZERS

(71) Applicant: Nikon Corporation, Tokyo (JP)

(72) Inventors: Yoon Jung Jeong, San Mateo, CA (US); Michael Birk Binnard, Belmont, CA (US); Alton Hugh Phillips, Oro Valley, AZ (US); Matthew Parker-Mccormick Bjork, Davis, CA (US)

(73) Assignee: Nikon Corporation, Tokyo (JP)

( * ) Notice: Subject to any disclaimer, the term of this patent is extended or adjusted under 35 U.S.C. 154(b) by 109 days.

(21) Appl. No.: 17/497,788

(22) Filed: Oct. 8, 2021

(65) Prior Publication Data

US 2022/0113487 A1    Apr. 14, 2022

Related U.S. Application Data

(60) Provisional application No. 63/089,904, filed on Oct. 9, 2020.

(51) Int. Cl.
*G02B 7/00*    (2021.01)
*B25J 9/10*    (2006.01)

(52) U.S. Cl.
CPC ............ *G02B 7/001* (2013.01); *B25J 9/1005* (2013.01)

(58) Field of Classification Search
CPC ....... G02B 7/001; B25J 9/1005; B25J 13/088; B25J 19/002; A61B 2090/504; A61B 2090/508; F16M 2200/041; F16M 11/12; F16M 11/121; F16M 11/123
USPC ........... 901/48; 248/127, 648, 123.11, 123.2, 248/162.1, 182.1, 280.11, 292.11, 297.11, 248/364

See application file for complete search history.

(56) References Cited

U.S. PATENT DOCUMENTS

| | | | |
|---|---|---|---|
| 4,976,387 A * | 12/1990 | Spianti | F16M 11/24 348/E5.025 |
| 5,751,078 A * | 5/1998 | Loewenthal | B64G 1/22 74/5.34 |
| 6,523,695 B1 | 2/2003 | Ueta et al. | |
| 6,590,639 B1 | 7/2003 | Yuan et al. | |
| 6,758,313 B2 | 7/2004 | Binnard | |
| 9,719,633 B2 * | 8/2017 | Sacksteder | F16M 13/04 |
| 10,202,973 B1 * | 2/2019 | Dreher | G05B 19/402 |
| 2011/0162476 A1 * | 7/2011 | Nakamura | A61B 90/50 901/19 |
| 2013/0222784 A1 * | 8/2013 | Shaw | G01S 17/08 356/4.01 |

(Continued)

OTHER PUBLICATIONS

Vincent "Google parent Alphabet launches Intrinsic: a new company to build software for industrial robots," downloaded from https://www.theverge.com/2021/7/23/22590109/google-intrinsic-industrial-robotics-company-software, 4 pp. (Jul. 23, 2021).

*Primary Examiner* — Bradley Duckworth
(74) *Attorney, Agent, or Firm* — Klarquist Sparkman, LLP

(57) ABSTRACT

Positioning assemblies for use with a robot include a gimbal assembly having a gimbal's rotational center is positioned directly above a center of gravity of a payload. One or more linear counter masses and/or one or more rotating masses (flywheels) can be provided, and each can include an actuator or brake to control forces acting between the counter masses and/or flywheels and the payload and stabilize the payload during and after movement of the payload with the robot.

47 Claims, 6 Drawing Sheets

(56) References Cited

U.S. PATENT DOCUMENTS

| | | | | |
|---|---|---|---|---|
| 2014/0205276 A1* | 7/2014 | Johnston | ............. | F16M 11/045 |
| | | | | 396/421 |
| 2019/0339597 A1* | 11/2019 | Wagner | ................. | F16M 11/18 |
| 2020/0390514 A1* | 12/2020 | Hirose | ................... | A61B 34/30 |
| 2021/0059783 A1* | 3/2021 | Haraguchi | ......... | A61B 1/00149 |
| 2021/0309503 A1* | 10/2021 | Donaldson | ............ | B66F 11/046 |

\* cited by examiner

BALANCED ACTIVE STABILIZERS

CROSS REFERENCE TO RELATED APPLICATION

This application claims the benefit of U.S. Provisional Patent Application No. 63/089,904, filed on Oct. 9, 2020, which is incorporated herein by reference in its entirety.

FIELD

The disclosure pertains to stable positioning with robots.

BACKGROUND

While robots can be used in a variety of applications, robot-based movement to precise locations tends to be slow due to the necessity of allowing vibrations to dampen and often, to provide time to fine-tune position. These problems are especially detrimental in applications that require precise, repeatable placement of optical axes of precision optical systems used in manufacturing and metrology. Alternative approaches are needed.

SUMMARY

Assemblies comprise a rotational support and a balance weight secured to the rotational support. An attachment member is operable to secure a payload, wherein the balance weight is situated so that a center of gravity of the assembly is situated below a rotational axis of the rotational support in an as-used orientation. The balance weight can be situated so that a center of gravity of a combination including at least the rotational support, the balance weight, the attachment member, and the payload is situated below the rotational axis of the rotational support in an as-used position. A counter mass can be movably attached to adjust a location of the center of gravity of the combination horizontally. A mover can be coupled to the counter mass and operable to translate the counter mass horizontally. An accelerometer can be fixed with respect to the attachment member to detect an acceleration of the payload. In some examples, a stabilizer controller is coupled to the accelerometer and the mover and is operable to translate the counter mass in response the acceleration sensed by the accelerometer. In some examples, a stabilizer controller is coupled to the accelerometer and the mover and is operable to translate the counter mass in response in response to a payload vibration detected by the accelerometer. In some embodiments, the rotational support includes a gimbal, a hinge, or a ball joint that defines the rotational axis.

In some examples, the assemblies include at least one flywheel and an associated rotational actuator and a brake, a rotation sensor coupled to detect a rotation of the payload, and a stabilizer controller coupled to the rotation sensor and the associated rotational actuator and operable to adjust the at least one flywheel with the rotational actuator in response to the detected rotation of the payload.

Methods comprise coupling a payload to a rotational mount having a horizontal rotational axis in an as-used orientation and fixing a balance weight to the rotational mount so that a center of mass of the combination including at least the balance weight, the payload, and the rotational mount is situated below the rotational axis in the as-used orientation. In some examples, the center of mass is adjusted with a counter mass secured to the rotational support. In some examples, an acceleration associated with the payload is detected, and a location of a counter mass is adjusted based on the acceleration. In some embodiments, a location of a counter mass is adjusted in response to a vibration of a payload and the payload and the balance weight are situated to have a vertical separation to select a period of oscillation about the rotational axis.

According to some examples, rotations of one or more flywheels are adjusted in response to an angular orientation of the payload. In some examples, the rotational mount is a gimbal, a hinge, or a ball and socket rotational mount. According to some examples, the rotational mount is translated with a movable device and at least one of a flywheel and counter mass are adjusted to reduce a payload vibration in response to the translating. In typical examples the translating is produced with a robot arm or a drone. In further examples, the payload is an optical beam source or an optical element that is operable to receive and/or direct an optical beam from/to a target.

Assemblies comprise a gimbal assembly couplable to a payload and a movable support, the gimbal assembly including a gimbal having a rotational axis and a balance weight secured to the gimbal assembly so that a center of gravity of a combination including at least the gimbal assembly, the payload, and the balance weight is situated below the rotational axis of the gimbal as secured to the movable support. At least one counter mass secured to the gimbal assembly and at least one counter mass actuator is operable to adjust a location of the at least one counter mass to displace the center of gravity of the combination along a horizontal axis with the gimbal assembly as secured to the movable support. An inertial measurement unit (IMU) is coupled to the gimbal assembly and is operable to report acceleration along at least one translation axis and orientation about at least one rotational axis. A stabilizer controller is coupled to the IMU and to the counter mass actuator to vary the location of the counter mass based on the acceleration along the at least one translational axis.

In some examples, the at least one counter mass includes a first counter mass and a second counter mass and the at least one counter mass actuator includes corresponding first and second counter mass actuators operable to adjust locations of the first counter mass and the second counter mass to displace the center of gravity of the combination along first and second horizontal axes with the gimbal assembly as secured to the movable support. In some embodiments, the IMU is operable to report orientation about at least one rotational axis and the assemblies further comprise at least one flywheel coupled to the gimbal assembly and at least one rotational actuator coupled to the flywheel, wherein the at least one rotational actuator is coupled to the stabilizer controller to adjust a rotation of the flywheel in response to the orientation about the at least one rotational axis provided by the IMU. In some examples, the IMU can be operable to report orientation about first and second rotational axes, and the assemblies further comprise a first flywheel and a second flywheel operable in response to a first rotational actuator and a second rotational actuator, respectively, and coupled to the stabilizer controller to adjust rotations of the first flywheel and the second flywheel in response to orientations about first and second rotational axes provided by the IMU.

In additional examples, a cylindrical shaft member having a cylinder axis is provided, wherein the gimbal is situated about the cylindrical shaft member so as to be rotatable about the cylinder axis, wherein the rotational axis of the gimbal is orthogonal to an intersects the cylinder axis. A base defining a bore can be provided, wherein at least a portion of the cylindrical shaft member is situated in the bore and is movable along an axis of the bore. The base can include a coupling operable to secure the payload and the at least one counter mass can be secured to the base. The IMU can be fixed with respect to the cylindrical shaft.

In additional examples, first, second, and third flywheels and first, second, and third rotational actuators, respectively, are coupled to the stabilizer controller, wherein the first flywheel is secured to be rotatable about the cylinder axis and the second and third flywheels are secured to the base to be rotatable about respective axes that are orthogonal to the cylinder axis, and the first, second, and third rotational actuators are coupled to the stabilizer controller to be responsive to orientations reported by the IMU. In some examples, the horizontal axis is perpendicular to the rotational axis of the gimbal with the gimbal assembly as secured to the movable support. In additional examples, at least one position sensor is secured with respect to the payload, a target, or the movable support. In some examples, the at least one position sensor is operable to determine a distance between one or more of the payload and the target object and the payload and the movable support. In some examples, the at least one position sensor includes position sensors secured with respect to each of the target, the movable support, and the payload and operable to determine distances between the payload and the target object and the payload and the movable support. In some examples, the position sensor secured with respect to the payload is secured to the payload or to a payload arm and the position sensor secured with respect to the movable support is secured to the movable support or to a support arm coupled to the movable support. The foregoing and other features and advantages of the disclosed technology will become more apparent from the following detailed description, which proceeds with reference to the accompanying figures.

DETAILED DESCRIPTION

Introduction and Terminology

Figure 1:
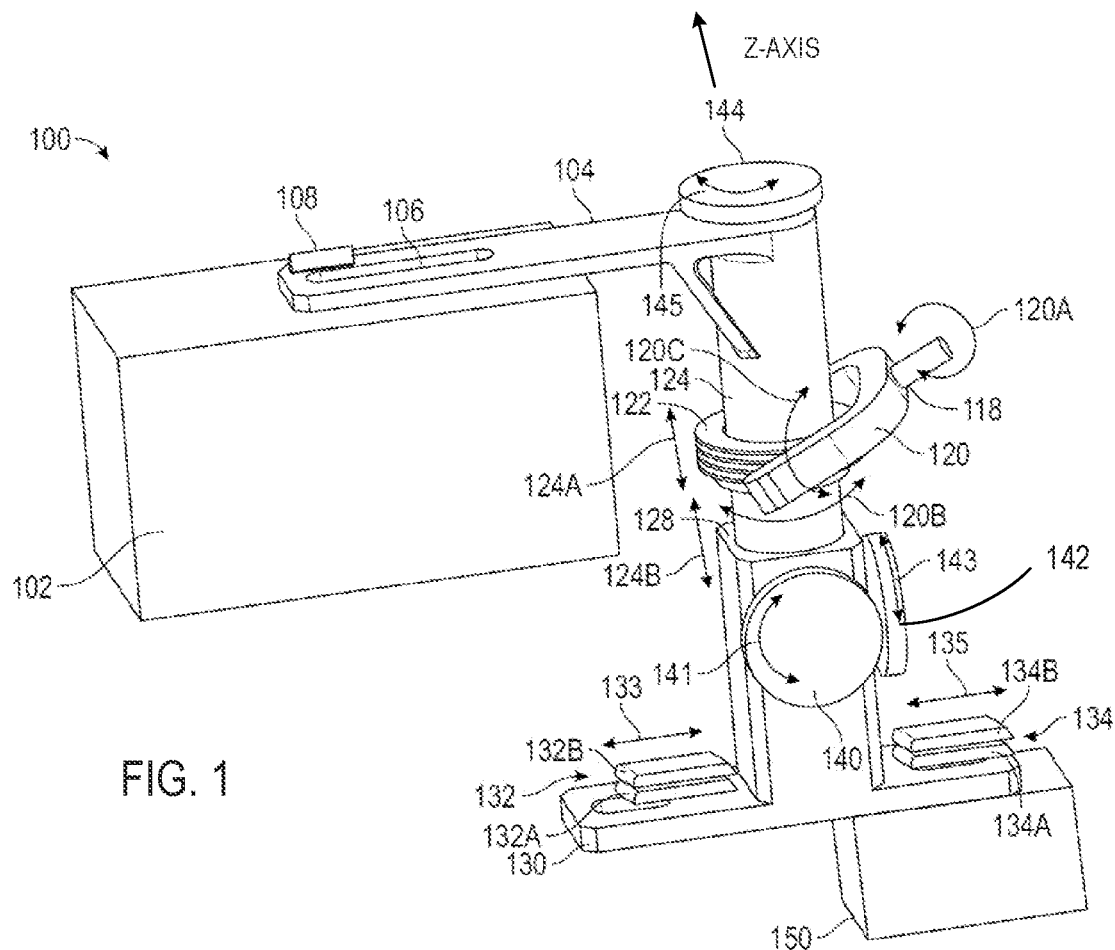
FIG. 1 illustrates a representative system that includes gimbal for positioning a payload.

The disclosed examples generally to pertain to systems, apparatus, and methods that can provide stable and accurate positioning at ends of robot arms or on other mobile structures such as drones or other vehicles, including car, trucks, carts, bicycles, and others. The disclosed approaches can typically reduce position errors and vibrations and can permit more precise positioning and repositioning by compensating or otherwise responding to linear and angular vibration by adjusting one or more counter masses or flywheels with associated actuators. Adjustment of counter masses or rotatable masses of flywheels with associated actuators can also permit fine tuning of payload position and orientation. Payloads can be supported with a controlled force that cancels gravity and, ideally, has zero stiffness between the payload and the mobile structure. Accelerating (and decelerating) forces can be provided to the payload for movement to new locations. These control forces can be applied without creating additional disturbances and vibrations, or disturbances and vibrations that are suitably small. In addition, a period of oscillation about an axis of rotation can be selected based on a separation of a balance weight and a payload due to an effective pendulum length.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items unless otherwise indicated.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms can be generally used for convenient description without implying any particular spatial orientation. However, as used herein, a center of mass (or center of gravity) is referred to herein as being lower than or below an axis of rotation when the center of mass is on an axis that is within 5, 10, 15, or 20 degrees of a vertical axis that is orthogonal to the axis of rotation in an as-used position. In addition, references to center of mass or center of gravity as being lower generally refer to positioning that is physical lower along a vertical axis.

Rotational support generally refers to an assembly that includes one or more devices that provide rotation about an axis of rotation such as a gimbal, hinge, ball and socket, a cylindrical bearing or bushing, or other rotation devices. The term actuator is used to refer to devices that can be used to adjust locations of counter masses or other objects via translations along one or more axes, or devices that can adjust rotations of one more flywheel masses, including piezoelectric devices, linear motors, voice coil motors, or others. Such adjustments can be applied to select a location of a center of mass or a moment of inertia. In some cases, such adjustments are made in response to linear or angular vibrations, typically of a payload or an associated support, and can be used to provide linear or angular braking. In other cases, adjustments are made to fine tune position. Linear or angular vibration can be detected with one or more position or rotation sensors. However, it can be convenient to provide position and/or rotation data using an inertial measurement unit (IMU) which can provide acceleration data and orientation data for one, two, or three translation axes and one, two, or three axes of rotation. As used herein, an IMU is operable to report at least one of an acceleration in a selected direction and an orientation about an axis. In some cases, actuators are used to rotate one or more flywheel masses during operation or in moving between locations to stabilize a payload orientation.

According to embodiments, a payload is moved from a first location to a second location, and one or more counter masses and/or flywheels are adjusted using associated actuators to establish or stabilize payload location and/or orientation. The disclosed approaches can be used to stabilize payloads such as light sources (from lasers, light emitting diodes, or other sources) or optical elements used to direct optical beams (such as mirrors, prisms, lenses, diffraction gratings, or other elements).

According to an embodiment, a robot holding a gimbal or other rotational mounting can move a payload to a desired location with a relatively large position error. The disclosed systems can correct or reduce this error by controlling acceleration/deceleration of one or more flywheels or counter masses while monitoring orientation via an IMU. This can allow the robot holding the payload to use a simple position controller that can be inexpensive to implement and provide rapid positioning.

Gimbal Positioner

Referring to FIG. 1, a gimbal-based positioning assembly 100 includes a support arm 104 that is operable for coupling to a payload 102. A slot 106 is provided for securing the payload 102 with bolts or other fasteners and an inertial measurement unit 108 is fixed with respect to the payload 102. The support arm 104 extends from a cylinder 124 that can be rotatable as shown at 120B in a bore defined in a base 128. The cylinder 124 can also be extendable along an axis 124B with respect to the base 128 to increase an effective length and associated pendulum frequency of oscillation. A collar 122 is situated about the cylinder 124 and is also rotatable about the cylinder 120 as indicated at 120B. The collar 122 is also translatable along the cylinder 124 as indicated at 124A. A gimbal 120 is rotatably fixed to the collar 122 and can be secured to a robot or other moving device with a shaft 118 that permits rotation as indicated at 120A. The gimbal 120 provides rotation of the cylinder 124, the collar 122, and the base 128 as indicated at 120C.

The base 128 includes an extension portion 130 to which first and second counter mass assemblies 132, 134 can be secured. The counter mass assemblies 132, 134 include actuators 132A, 134A (typically linear actuators) and counter masses 132B, 134B, respectively. Typically, the counter masses 132B, 134B are translatable along axes 133, 135, respectively, to adjust a location of a center of mass or to compensate vibration of the payload 102. By appropriately moving one or more counter masses, the payload can be held in a balanced position and tend to remain balanced as the assembly 100 is moved or balance can be disturbed to reduced vibrations or oscillations (or to induce vibrations and oscillations). In addition, a balance weight 150 is secured to the extension portion 130 to balance the payload 102 to provide a center of mass below an axis of rotation of the gimbal 120. With the balance weight 150 situated in this way, the payload is balanced with the assembly 100 and tends to remain balanced and stable if moved. Flywheels 140, 142, 144 include rotatable masses and rotational actuators to provide rotations as indicated at 141, 143, 145, respectively. Rotation can be provided to compensate orientation errors, vibrations, or to generally stabilize the assembly.

Brakes can also be included.

Figure 1A:
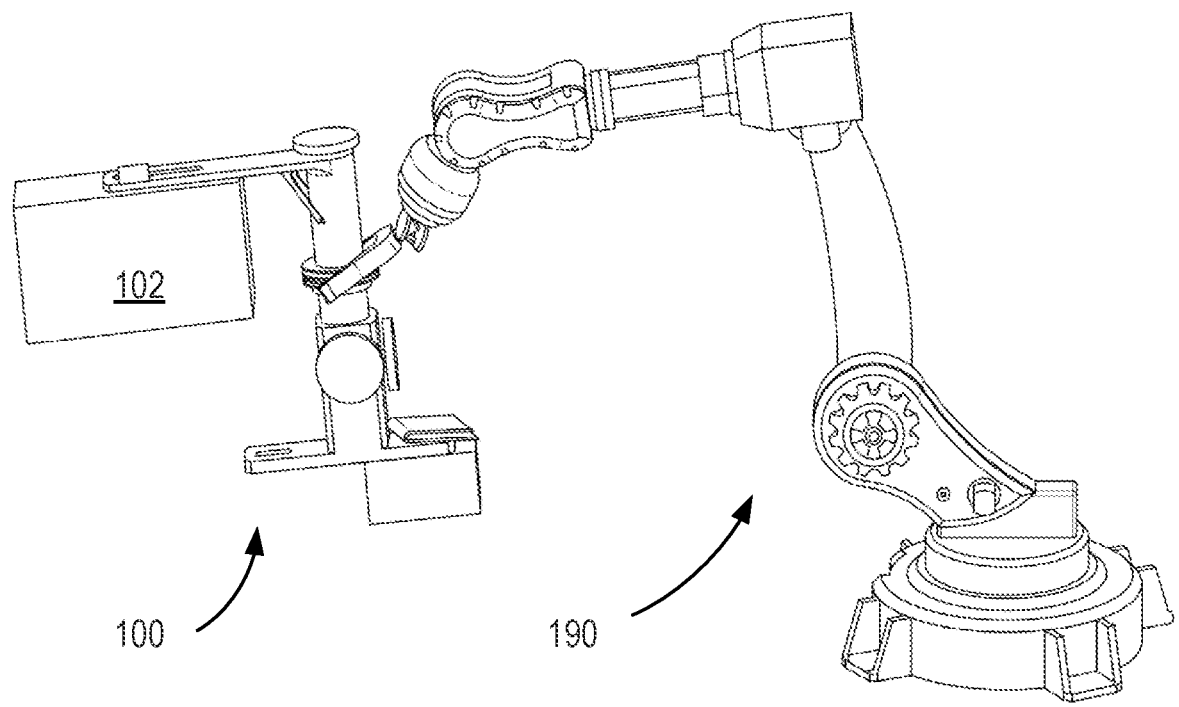
FIG. 1A illustrates the positioning assembly of FIG. 1 secured to a robot arm.

FIG. 1A illustrates the positioning assembly 100 coupled to a robot arm 190. The robot arm 190 can be controlled to position the payload 102 as needed, and the balance weight 150, counter mass assemblies 132, 134, and flywheels 140, 142, 144 shown in FIG. 1 can be activated to reduce positioning errors, speed-up a rate at which position changes can be made, and/or compensate vibrations and position and orientation errors. The counter mass assemblies and flywheels shown in FIG. 1 can be used to induce orientation changes as well. For example, rotation of a rotatable mass can be initiated or braked using an actuator so that the angular momentum causes the gimbal 120 to pivot. If the rotatable mass in the flywheel 144 is rotating in a clockwise direction about a z-axis, deceleration of the rotating mass with the actuator causes a clockwise rotation of the payload 102 and components fixed to the payload 102. Generally, angular momentum of any of the flywheels 140, 142, 144 can be used to create movement or provide stabilization.

Example Hinge Positioner

Figure 2:
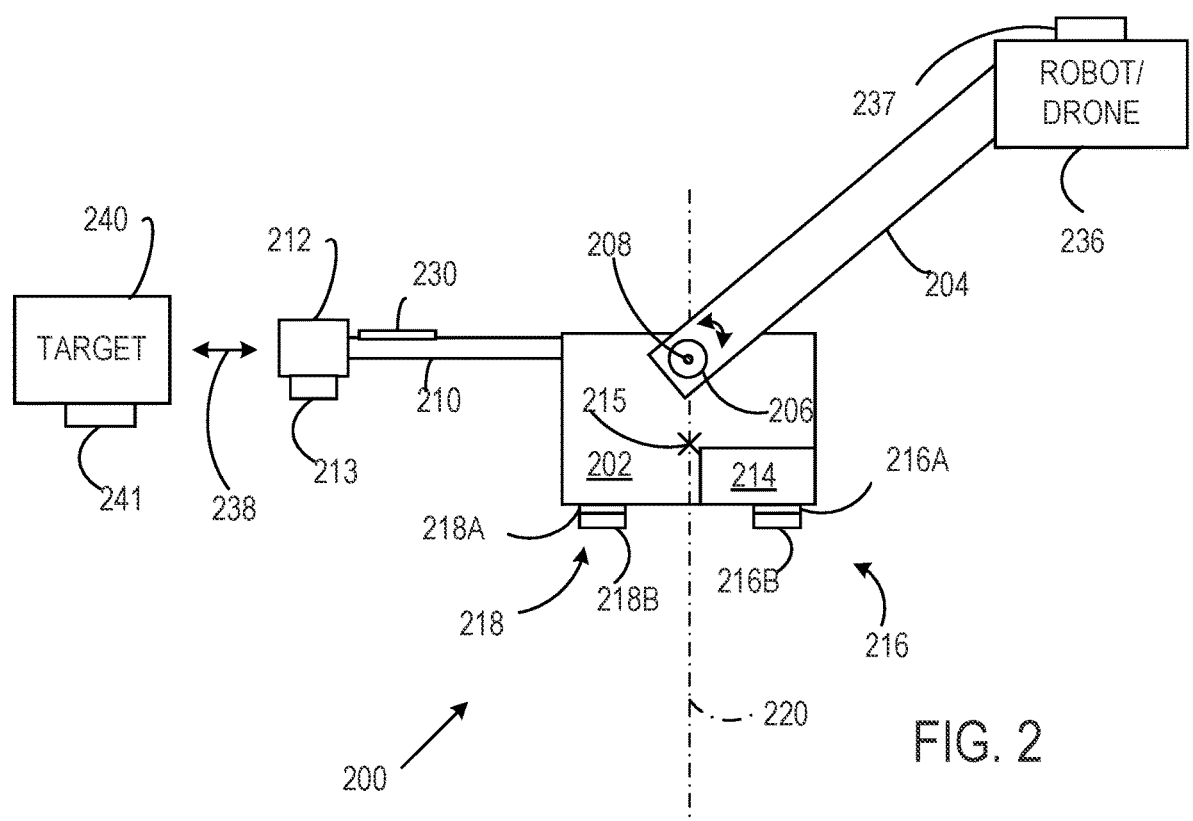
FIG. 2 illustrates a representative positioning system that includes a hinge.

Referring to FIG. 2, a positioning assembly 200 includes a rotation support 202 that includes a hinge 206 having a rotational axis 208. An arm 204 is rotatably coupled to the hinge 206 and can be secured to a robot, a drone, a vehicle of any kind, or other mover. A payload arm 210 extends from the rotational support 202 and retains a payload 212. A balance weight 214 is situated so that a center of mass 215 of the assembly is situated on an axis 220 that is vertical and intersects the rotational axis 208 in an as-used orientation. In this way, the payload 212 is balanced in an as-used position and does not require forces be applied to hold the payload 212 in position. Counter mass assemblies 216, 218 are coupled to the rotation support 202 and include actuators 216A, 218A and counter masses 216B, 218B, respectively. The counter mass assemblies 216, 218 are generally situated to tune a location of the center of mass 215 or to compensate vibration. However, one or more counter mass assemblies can be provided to adjust the center of mass 215 in more than one direction. Similarly, flywheel assemblies with rotatable masses and actuators can be provided to adjust, compensate, or stabilize orientation. Suitable signals that indicate orientation and/or acceleration are provided by an IMU 230 that can be fixed to the payload 212, the payload arm 210 or other location. As shown, the positioning assembly is arranged to provide an optical beam 238 from the payload 212 to a target 240 and is movable with a robot or drone 236 that is attached to the arm 204. Position sensors 213, 237, 241 are secured to the payload 212, the robot 236, and the target 241, respectively. The position sensors can be fixed to other locations that permit relative positions to be determined. These sensors can be used to determine position errors or assess consequences of vibration.

Ball and Socket Positioner

Figure 3:
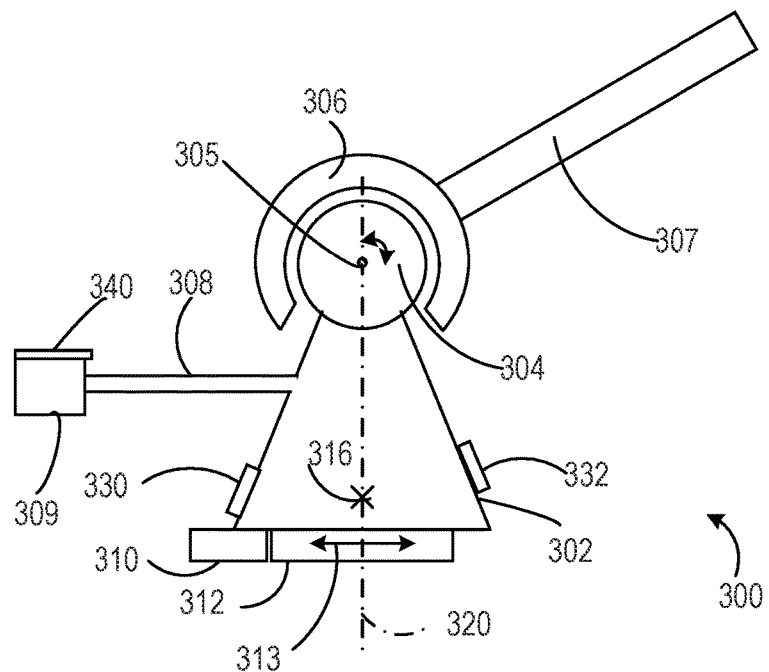
FIG. 3 illustrates a representative positioning system that includes a ball and socket.

Referring to FIG. 3, a positioning assembly 300 includes a base member 302 that is coupled to or integral with a ball 304 that is rotatable in cavity defined by a socket piece 306. The ball 304 is rotatable about a center 305 about any axis. A payload arm 308 is fixed to ball 304 and can secure a payload 309. The socket piece 306 is secured to a robot, a drone, a vehicle of any kind, or other mover with a member 307. A balance weight 312 is translatable along an axis 313 so that a center of mass 316 of the assembly 300 (including the payload 309) is situated on an axis 320 that extends vertically through the center 305 of the ball 304 with the assembly in an as-used orientation. Counter mass assemblies 310, 330 that include counter masses and actuators can be secured to the base member 302 along with one or more flywheels such as representative flywheel 332. Suitable signals that indicate orientation and/or acceleration are provided by an IMU 340 that can be fixed to the payload 309 as shown or to the payload arm 308 or other location.

Processing System

Figure 4:
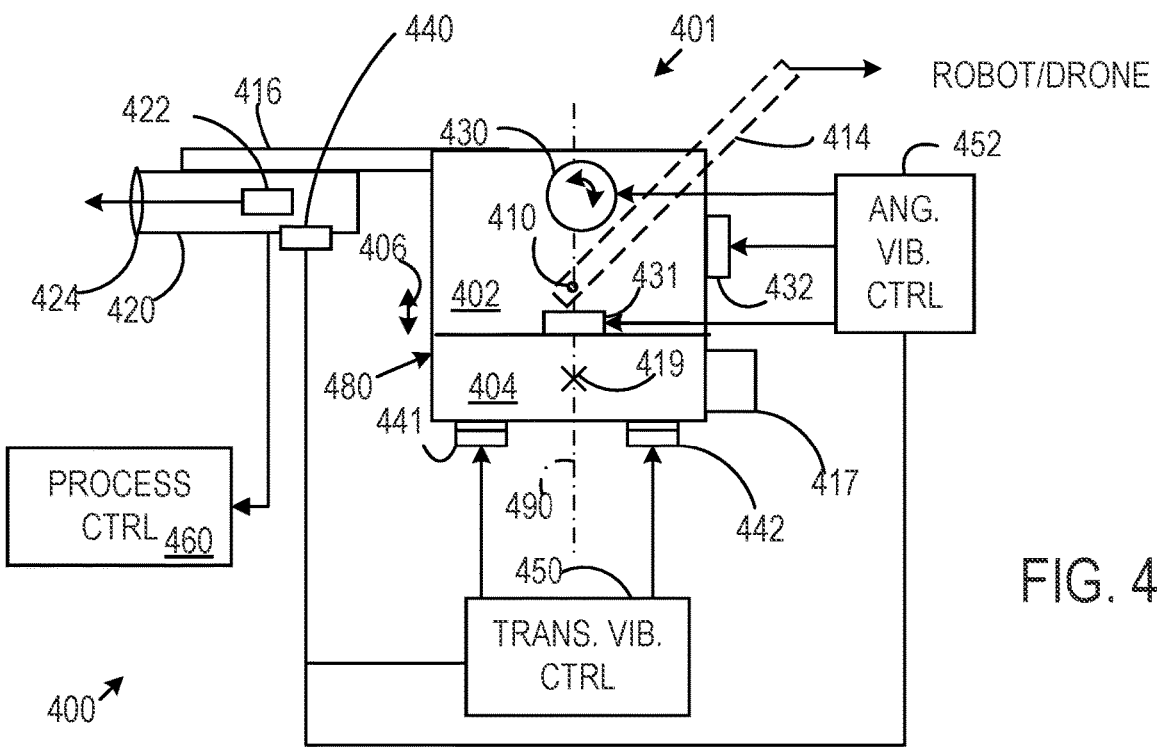
FIG. 4 illustrates a represent system adapted for positioning and orienting a payload.

Referring to FIG. 4, a processing system 400 includes a positioning assembly 401 having an extendable base 480 that includes a first portion 402 and a second portion 404 that can be adjusted to shorten or lengthen along an axis 406. Such length changes can be used to tune a pendulum period of oscillation as desired. The first portion 402 is coupled to a robot arm connection member 414 that is rotatable about an axis 410 and configured for coupling to a robot, a drone, a vehicle, or other movable device. The connection member 414 can be coupled with a pin, a bearing, a sleeve, or other rotational connecter. A payload arm 416 is secured to retain a payload 420 that in this example is a laser beam emitter and includes a laser 422 and a lens 424. For example, the payload can include at least a part of an optical system or an optical element (e.g., a light source), for outputting a laser beam. In certain embodiments, the laser light source can be located around a base of the robot arm or at other locations and can be linked to the end effector by an optical fiber or other light guide/wave guide. With a light guide, a light source need not be part of a payload, and only beam shaping optics and an optical fiber or other light guides secured as a payload. A balance weight 417 is adjustable in mass or position to place a center of mass 419 directly below the rotational axis 410 and along a vertical axis 490 in an as-used orientation. Flywheel assemblies 430-432 with rotatable masses and actuators are coupled to the first portion 402 (or to other convenient locations) and counter mass assemblies 441, 442 with translatable masses and actuators are coupled to the second portion 404 (or other convenient locations). Suitable signals that indicate orientation and/or acceleration are provided by an IMU 440 that can be fixed to the payload 420 as shown or to the payload arm 416 or other location.

An angular controller 452 is coupled to the flywheel assemblies 430-432 and a translational controller 450 is coupled to the counter mass assemblies 441-442. These controllers are conveniently provided by a single control system but can be separate as shown. Both are coupled to the IMU 440 to receive signals indicating acceleration and orientation. Flywheels can be actuated to serve as gyroscopes for stabilization or to correct rotational errors or oscillations and the counter masses can be actuated to adjust center of mass or control oscillations or both. In addition, actuation of a rotatable mass or braking of a rotating rotatable mass can be used to rotate a payload. A process controller 450 can be coupled to direct movements.

Positioning and Control Systems

Figure 5:
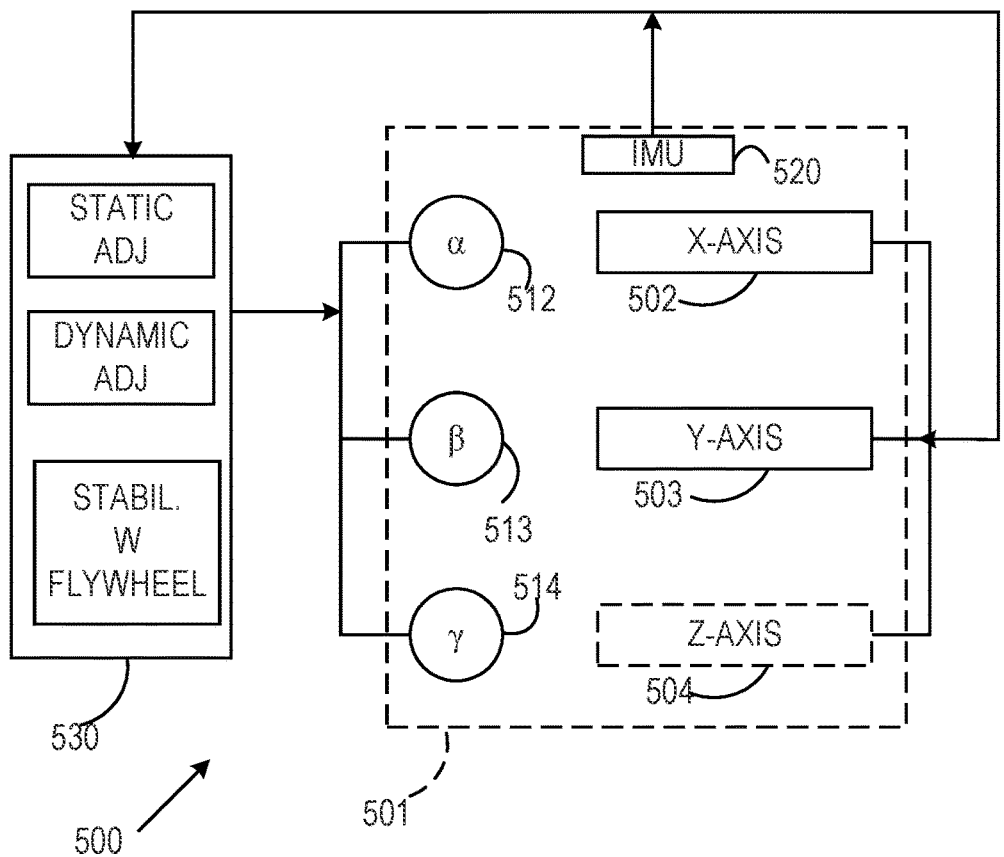
FIG. 5 is a block diagram of a representative stabilizer controller.

Referring to FIG. 5, a representative positioning system 500 includes a positioning assembly 501 that includes flywheel assemblies 512-514 which can provide rotations of flywheel masses about different axes. Counter mass assemblies 502-504 are also provided to translate counter masses along differing axes. In typical examples, counter mass assemblies 502, 503 are provided to adjust a location of a center of mass horizontally in an as-used orientation, and the vertical counter mass assembly 504 is not used. An IMU 520 is fixed to the positioning system to provide signals corresponding to acceleration in one, two, or three directions as well as orientations about three different axes. The signals are coupled to a controller 530 that can determine actuator drive signals to provide static balance or orientation, provide drive signals in response to motion of the positioning system, or stabilization by spinning one or more flywheels.

Positioning Methods

Figure 6:
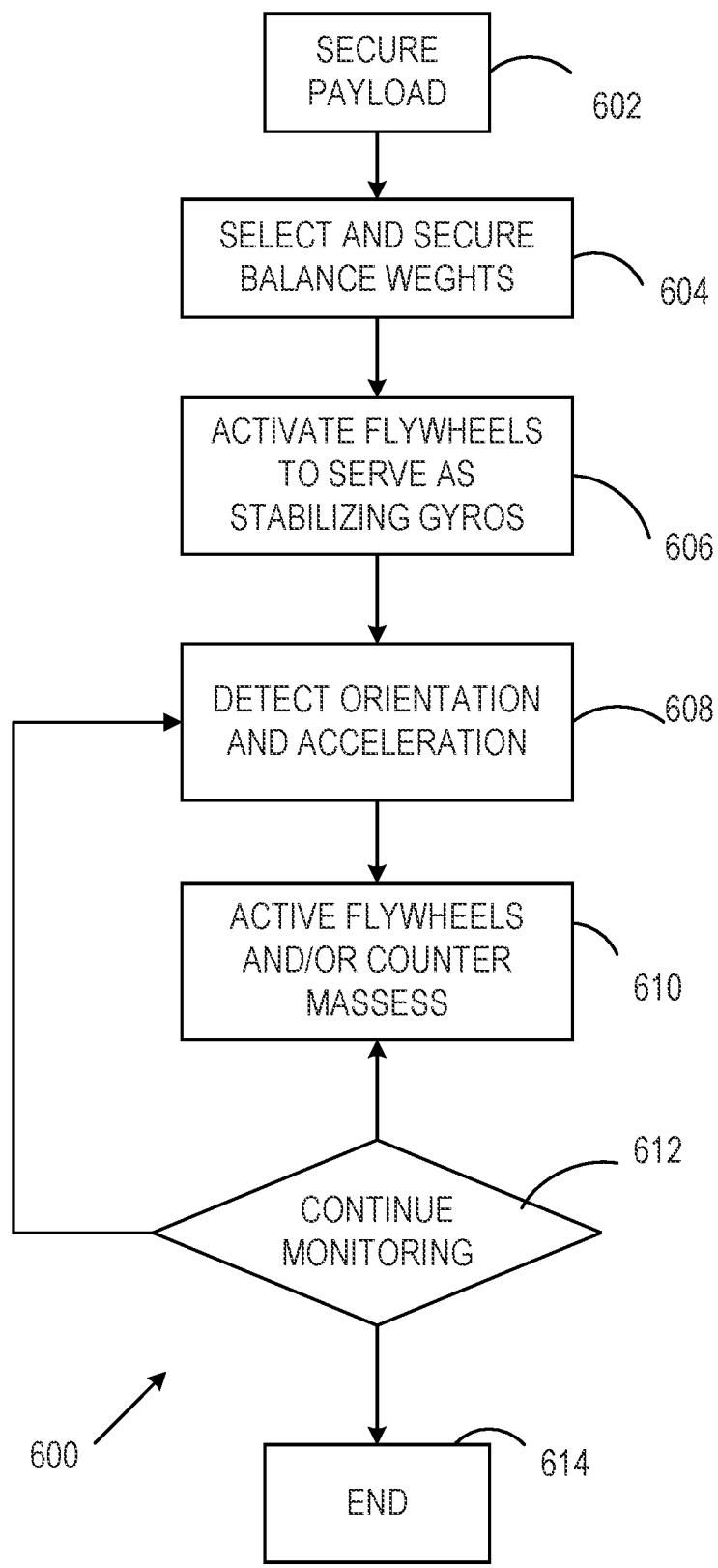
FIG. 6 illustrates a representative method of stabilizing a payload.

Referring to FIG. 6, a representative method 600 includes securing a payload to a rotational mounting assembly at 602 and selecting and securing one or more balance weights at 604 to place a center of mass below an axis of rotation. If preferred, flywheels can be activated at 606 for stabilization, and at 608, orientation and acceleration are detected with one or more sensors such as an IMU. At 610, one or more flywheels or counter masses are activated in response to tune or correct position or orientation or to reduce vibration. If continued monitoring and correction of vibration, center of mass location, and orientation is selected at 612, orientation and acceleration are detected again at 608. If further compensation is not desired, the method 600 can be terminated at 614.

Figure 7:
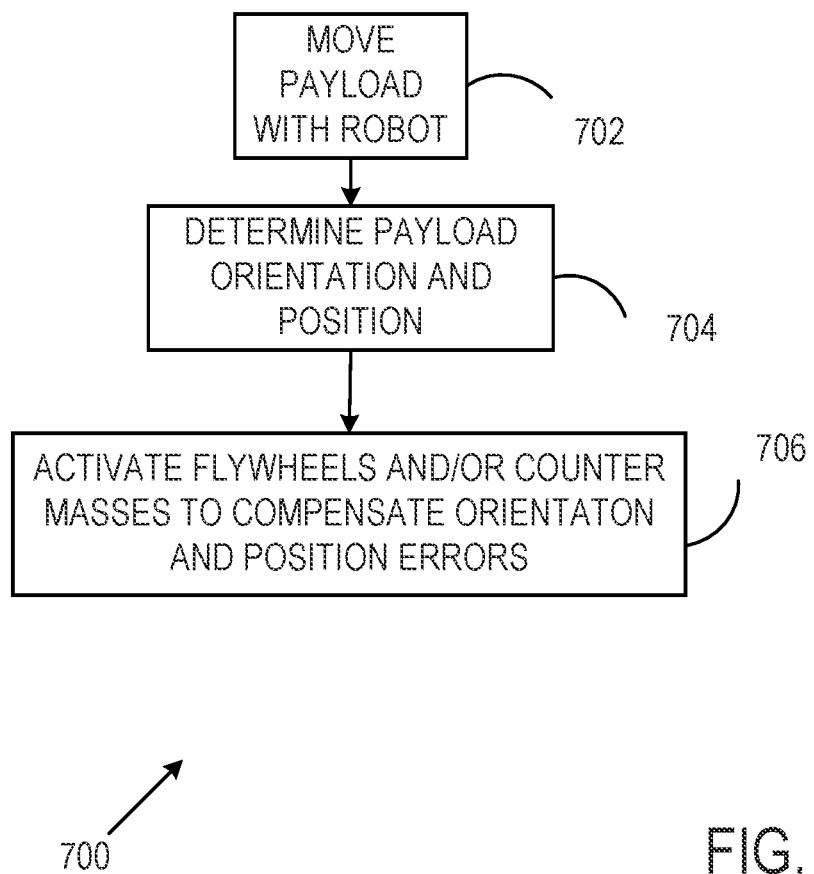
FIG. 7 illustrates a representative method of adjusting payload position.

Referring to FIG. 7, a method 700 includes moving a payload with a robot, drone, or other device at 702. After movement, a position and orientation of the payload is determined at 704 to establish orientation and/or position error. At 706, one or more flywheels or counter masses are activated or braked to adjust payload position based on the position error. In this way, a relatively large robot positioning error can be rapidly corrected. In other examples, the one or more flywheels or counter masses are activated or braked during movement of the payload with the robot. In some examples, position error is not measured, but can be established without additional measurement. As discussed above, rotating masses can be spun at a reasonably high angular velocity during normal operation to resist rotational disturbances.

In view of the many possible embodiments to which the principles of the disclosed technology may be applied, it should be recognized that the illustrated embodiments are only examples and should not be taken as limiting.

We claim:

1. An assembly, comprising:
   rotational support;
   an attachment member operable to secure a payload;
   a counter mass coupled to the rotational support and movably attached to adjust a location of a center of gravity of a combination including at least the rotational support, the counter mass, the attachment member and the payload; and
   a mover coupled to the counter mass and operable to translate the counter mass, and
   a controller coupled to the mover and configured to translate the counter mass to adjust a center of gravity or to compensate vibration of the payload, wherein the center of gravity of a combination including at least the rotational support, the counter mass, the attachment member, and the payload is situated below a rotational axis of the rotational support in an as-used position.

2. The assembly of claim 1, wherein the counter mass is movably attached to adjust a location of the center of gravity of the combination including at least at least the rotational support, the counter mass, the attachment member, and the payload horizontally.

3. The assembly of claim 2, wherein the mover is coupled to the counter mass and configured to translate the counter mass horizontally.

4. The assembly of claim 1, further comprising an accelerometer fixed with respect to the attachment member to detect an acceleration of the payload.

5. The assembly of claim 4, wherein the controller is coupled to the accelerometer and the mover and configured to translate the counter mass in response to an acceleration sensed by the accelerometer.

6. The assembly of claim 4, wherein the controller is coupled to the accelerometer and the mover and configured to translate the counter mass in response to a payload vibration detected by the accelerometer.

7. The assembly of claim 1, wherein the rotational support includes a gimbal, a hinge, or a ball joint that defines a rotational axis.

8. The assembly of claim 1, further comprising:
   at least one flywheel and an associated rotational actuator and a brake; and
   a rotation sensor coupled to detect a rotation of the payload;
   wherein the controller is coupled to the rotation sensor and the associated rotational actuator and operable to adjust the at least one flywheel with a rotational actuator in response to a detected rotation of the payload.

9. A method, comprising:
   coupling a payload to a rotational support with an attachment member; and
   with a controller, controlling a mover that moves a counter mass to adjust a location of a center of gravity of a combination including at least the rotational support, the counter mass, the attachment member and the payload to adjust the center of gravity or to compensate vibration of the payload, wherein the center of gravity of the combination including at least the rotational support, the counter mass, the attachment member, and the payload is situated below a rotational axis of the rotational support in an as-used position.

10. The method of claim 9, further comprising adjusting the center of gravity with the counter mass secured to the rotational support.

11. The method of claim 9, further comprising detecting an acceleration associated with the payload, and adjusting a location of the counter mass based on the acceleration.

12. The method of claim 9, further comprising adjusting a location of a counter mass in response to a vibration of the payload.

13. The method of claim 9, further comprising situating the payload and the counter mass to have a vertical separation to select a period of oscillation about a horizontal rotational axis.

14. The method of claim 9, further comprising adjusting rotations of one or more flywheels in response to an angular orientation of the payload.

15. The method of claim 9, wherein the rotational support is a gimbal, a hinge, or a ball and socket rotational mount.

16. The method of claim 9, further comprising translating the rotational support with a movable device and adjusting at least one of a flywheel and the counter mass to reduce a payload vibration in response to the translating.

17. The method of claim 16, wherein the translating is produced with a robot arm or a drone.

18. The method of claim 9, wherein the payload is an optical beam source or an optical element that is operable to receive and direct an optical beam to a target.

19. An assembly, comprising:
   a gimbal assembly couplable to a payload and a movable support, the gimbal assembly including a gimbal having a rotational axis;
   at least one counter mass secured to the gimbal assembly;
   at least one counter mass actuator operable to adjust a location of the at least one counter mass to displace a center of gravity of a combination of at least the payload, the gimbal assembly, and the counter mass along a horizontal axis with the gimbal assembly as secured to the movable support;
   an inertial measurement unit (IMU) coupled to the gimbal assembly, the IMU operable to report an acceleration along at least one translation axis and an orientation about at least one rotational axis; and
   a stabilizer controller coupled to the IMU and to the counter mass actuator to vary the location of the counter mass based on the reported acceleration along the at least one translational axis, wherein the center of gravity of the combination including at least the payload, the gimbal assembly, and the counter mass is situated below a rotational axis of the gimbal assembly in an as-used position.

20. The assembly of claim 19, wherein the at least one counter mass includes a first counter mass and a second counter mass and the at least one counter mass actuator includes corresponding first and second counter mass actuators operable to adjust locations of the first counter mass and the second counter mass to displace the center of gravity of the combination along first and second horizontal axes with the gimbal assembly as secured to the movable support.

21. The assembly of claim 19, wherein the IMU is operable to report orientation about at least one rotational axis and further comprising at least one flywheel coupled to the gimbal assembly and at least one rotational actuator coupled to the flywheel, wherein the at least one rotational actuator is coupled to the stabilizer controller to adjust a rotation of the flywheel in response to the orientation about the at least one rotational axis provided by the IMU.

22. The assembly of claim 19, wherein the IMU is operable to report orientation about first and second rotational axes, and further comprising a first flywheel and a second flywheel operable in response to a first rotational actuator and a second rotational actuator, respectively, and coupled to the stabilizer controller to adjust rotations of the first flywheel and the second flywheel in response to orientations about first and second rotational axes provided by the IMU.

23. The assembly of claim 19, further comprising a cylindrical shaft member having a cylinder axis wherein the gimbal is situated about the cylindrical shaft member so as to be rotatable about the cylinder axis, wherein the rotational axis of the gimbal is orthogonal to and intersects the cylinder axis.

24. The assembly of claim 23, further comprising a base defining a bore, wherein at least a portion of the cylindrical shaft member is situated in the bore and is movable along an axis of the bore.

25. The assembly of claim 24, wherein the base includes a coupling operable to secure a balance weight.

26. The assembly of claim 24, wherein the at least one counter mass is secured to the base.

27. The assembly of claim 25, wherein the IMU is fixed with respect to the cylindrical shaft member.

28. The assembly of claim 25, further comprising first, second, and third flywheels and first, second, and third rotational actuators, respectively, coupled to the stabilizer controller, wherein the first flywheel is secured to be rotatable about the cylinder axis and the second and third flywheels are secured to the base to be rotatable about respective axes that are orthogonal to the cylinder axis, and the first, second, and third rotational actuators are coupled to the stabilizer controller to be responsive to orientations reported by the IMU.

29. The assembly of claim 19, wherein the horizontal axis is perpendicular to the rotational axis of the gimbal with the gimbal assembly as secured to the movable support.

30. The assembly of claim 19, further comprising at least one position sensor secured with respect to the payload, a target, or the movable support.

31. The assembly of claim 30, wherein the at least one position sensor is operable to determine a distance between one or more of the payload and the target and the payload and the movable support.

32. The assembly of claim 31, wherein the at least one position sensor includes position sensors secured with respect to each of the target, the movable support, and the payload and operable to determine distances between the payload and the target and the payload and the movable support.

33. The assembly of claim 32, wherein at least one of the position sensors is secured with respect to the payload or to a payload arm and at least one of the position sensors is secured with respect to the movable support or to a support arm coupled to the movable support.

34. An assembly for supporting a payload, comprising:
a first member operable to attach to the payload; and
a second member coupled to support the first member rotatably around an axis of rotation, wherein a center of gravity for a combination including at least the first member, the second member, and the payload is situated below the axis of rotation, wherein at least one of the first member and the second member includes a counter mass that is movable to adjust a location of the center of gravity with respect to the axis of rotation and the counter mass is coupled to an actuator that is operable to translate the counter mass to adjust the location of the center of gravity with respect to the axis of rotation.

35. The assembly of claim 34, wherein the center of gravity for a combination including at least the first member, the second member, and the payload is situated below the axis of rotation in an as-used orientation.

36. The assembly of claim 34, wherein the first member includes a balance weight.

37. The assembly of claim 36, wherein with the payload attached to the first member, the balance weight is situated on a side of the axis of rotation opposite the payload.

38. The assembly of claim 37, wherein the balance weight is situated below the axis of rotation.

39. The assembly of claim 34, wherein the second member includes a balance weight.

40. The assembly of claim 39, wherein with the payload attached to the first member, the balance weight is situated on a side of the axis of rotation opposite the payload.

41. The assembly of claim 40, wherein the balance weight is situated below the axis of rotation.

42. The assembly of claim 34, wherein the second member is coupled to a robot.

43. The assembly of claim 34, wherein the payload includes a portion of an optical beam system.

44. The assembly of claim 34, wherein at least one of the first member and the second member includes a flywheel.

45. The assembly of claim 44, wherein the flywheel is coupled to an actuator that is operable to rotate the flywheel.

46. The assembly of claim 44, wherein the flywheel is coupled to a brake that is operable to inhibit rotation of the flywheel.

47. An assembly, comprising:
a gimbal assembly couplable to a payload and a movable support, the gimbal assembly including a gimbal having a rotational axis, a center of gravity of a combination including the gimbal assembly and the payload being situated below the rotational axis of the gimbal as secured to the movable support;
at least one counter mass secured to the gimbal assembly;
at least one counter mass actuator operable to adjust a location of the at least one counter mass to displace the center of gravity of the combination along a horizontal axis with the gimbal assembly as secured to the movable support;
an inertial measurement unit (IMU) coupled to the gimbal assembly, the IMU operable to report an acceleration along at least one translation axis and an orientation about at least one rotational axis; and
a stabilizer controller coupled to the IMU and to the counter mass actuator to vary the location of the counter mass based on the acceleration along the at least one translational axis.

* * * * *

UNITED STATES PATENT AND TRADEMARK OFFICE
CERTIFICATE OF CORRECTION

PATENT NO. : 12,066,677 B2
APPLICATION NO. : 17/497788
DATED : August 20, 2024
INVENTOR(S) : Jeong et al.

Page 1 of 1

It is certified that error appears in the above-identified patent and that said Letters Patent is hereby corrected as shown below:

In the Claims

Column 9, Line 22, Claim 2, "including at least at least the rotational" should read --including at least the rotational--

Signed and Sealed this
Twenty-eighth Day of January, 2025

Coke Morgan Stewart
*Acting Director of the United States Patent and Trademark Office*